(12) United States Patent
Südow et al.

(10) Patent No.: US 8,582,394 B2
(45) Date of Patent: Nov. 12, 2013

(54) METHOD FOR DETERMINING POSITIONS OF SENSOR STREAMERS DURING GEOPHYSICAL SURVEYING

(75) Inventors: Gustav Göran Mattias Südow, Solna (SE); Jon Falkenberg, Jar (NO); Bengt Rickard Finnoen, Katy, TX (US)

(73) Assignee: PGS Geophysical AS, Oslo (NO)

(*) Notice: Subject to any disclaimer, the term of this patent is extended or adjusted under 35 U.S.C. 154(b) by 231 days.

(21) Appl. No.: 13/327,404

(22) Filed: Dec. 15, 2011

(65) Prior Publication Data
US 2013/0155807 A1 Jun. 20, 2013

(51) Int. Cl.
*G01V 1/38* (2006.01)

(52) U.S. Cl.
USPC ............................................ 367/19; 367/21

(58) Field of Classification Search
USPC ................................. 367/19, 21, 24
See application file for complete search history.

(56) References Cited

U.S. PATENT DOCUMENTS

| | | | |
|---|---|---|---|
| 4,481,611 A | 11/1984 | Burrage | |
| 4,992,990 A | 2/1991 | Langeland et al. | |
| 7,047,898 B2 | 5/2006 | Petersen et al. | |
| 7,376,045 B2 | 5/2008 | Falkenberg et al. | |
| 7,404,370 B2 | 7/2008 | Stokkeland | |
| 7,881,153 B2 | 2/2011 | Stokkeland et al. | |
| 8,223,585 B2* | 7/2012 | Seale et al. | 367/19 |
| 2006/0215489 A1* | 9/2006 | Solheim et al. | 367/20 |
| 2006/0256654 A1* | 11/2006 | Paulsen | 367/20 |
| 2007/0091719 A1* | 4/2007 | Falkenberg et al. | 367/19 |
| 2007/0230268 A1* | 10/2007 | Hoogeveen et al. | 367/19 |
| 2008/0304358 A1* | 12/2008 | Mellier et al. | 367/19 |
| 2009/0245019 A1 | 10/2009 | Falkenberg et al. | |
| 2009/0290448 A1* | 11/2009 | Vassallo et al. | 367/21 |

FOREIGN PATENT DOCUMENTS

| | | |
|---|---|---|
| CN | 101685164 A | 3/2010 |
| EP | 2128654 A2 | 2/2009 |
| GB | 2424482 A | 9/2006 |
| GB | 2488892 A | 9/2012 |
| WO | 0155747 A1 | 8/2001 |
| WO | 03100451 A2 | 12/2003 |

OTHER PUBLICATIONS

Sonardyne Sound in Depth, Sonardyne International Limited, United Kingdom.
United Kingdom Search Report for Application No. GB1221752.7, dated: Mar. 14, 2013.

* cited by examiner

*Primary Examiner* — Isam Alsomiri
*Assistant Examiner* — Hovhannes Baghdasaryan

(57) ABSTRACT

A method for determining geodetic position of at least one point on a geophysical sensor streamer towed by a vessel in a body of water includes determining geodetic positions of a plurality of locations along a first geophysical sensor streamer towed at a first depth in the body of water. A lateral offset is caused between the first geophysical sensor streamer and a second geophysical sensor streamer towed at a second depth in the body of water. A distance is measured between at least two selected points along the first geophysical sensor streamer and a selected point along the second geophysical sensor streamer. A depth is measured at at least one point along the second geophysical sensor streamer. A geodetic position is determined at a selected point along the second geophysical sensor using the depth measurement, a direction of the lateral offset and the measured distances.

24 Claims, 4 Drawing Sheets

US 8,582,394 B2

METHOD FOR DETERMINING POSITIONS OF SENSOR STREAMERS DURING GEOPHYSICAL SURVEYING

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The invention relates generally to the field of marine geophysical surveying. More particularly, at least in some embodiments, the invention relates to methods for determining geodetic locations of positions on streamers towed at water depths which make impractical the use of geodetic position sensor signals and tail buoys.

Marine geophysical surveying techniques known in the art include seismic surveying and electromagnetic surveying. In such surveying techniques, a survey vessel or other vessel may tow one or more streamers. A streamer is essentially a long cable with sensors disposed at spaced apart locations along the length of the cable. Seismic streamers may include pressure responsive sensors, particle motion responsive sensors, or combinations and variations thereof generally responsive to seismic energy propagating in a body of water. Electromagnetic sensors may include, without limitation, electrodes, wire coils, magnetometers, or other devices to detect electromagnetic fields in the body of water. Such fields may be naturally occurring or may be induced by actuating an electromagnetic energy source in the water.

The foregoing surveys may be used to generate images of the distribution of acoustic and electrical properties of formations below the water bottom. Such images may be used to predict the location of hydrocarbons or other useful fluids prior to or in conjunction with drilling operations. Generating accurate images requires, among other things, accurate location of each of the sensors on each of the streamers at all times during survey operations.

In some cases, marine geophysical surveying may be performed using only one geophysical sensor streamer towed near the water surface. Another streamer may be towed at a selected depth in the water wherein the other streamer is completely submerged. It is desirable to have a method that can enable determining geodetic position along an entire submerged geophysical sensor streamer from information from only two geophysical sensor streamers.

DETAILED DESCRIPTION

Figure 1:
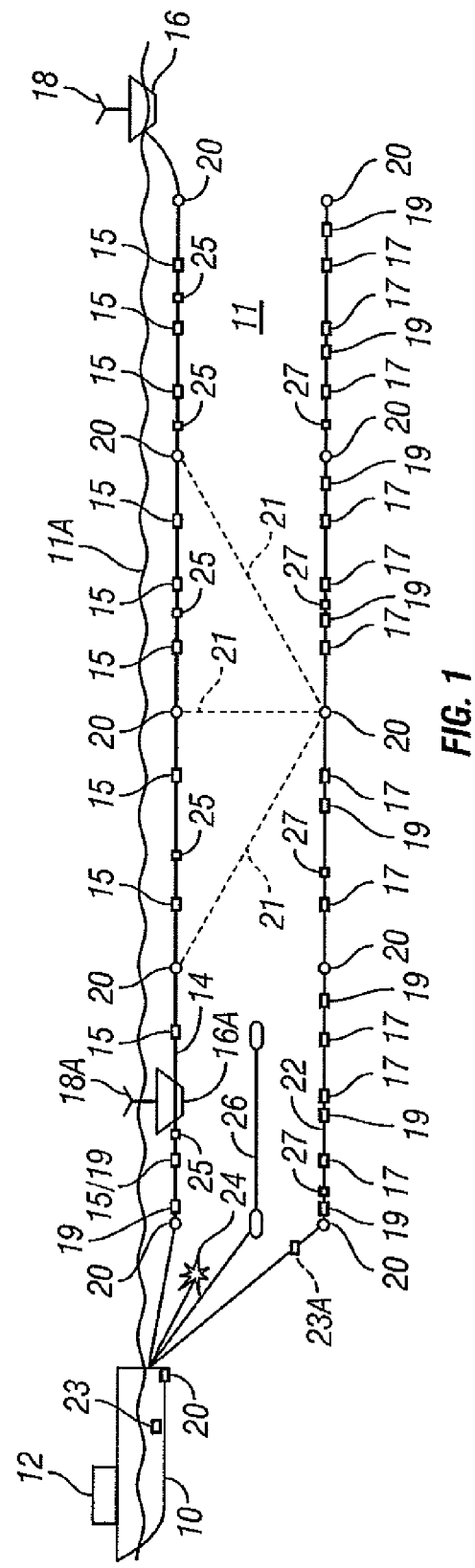
FIG. 1 is a view in the vertical plane of an example embodiment of a marine geophysical sensor streamer system.

FIG. 1 shows a view in the vertical plane of an example embodiment of a marine geophysical survey system. The present embodiment may be a combined electromagnetic and seismic survey system, although the scope of the invention is not limited to such combined survey systems. The combined electromagnetic and seismic survey system may include a survey vessel 10 that moves along the surface 11A of a body of water 11 such as a lake or ocean. The survey vessel 10 may include thereon certain equipment, shown generally at 12 and referred to for convenience as a "recording system." The recording system 12 may include any or all of the following components: (none of which is shown separately for clarity of the illustration) devices for navigating the survey vessel 10 including determining its geodetic position at any time; devices for recording sensor signals from various sensors deployed on streamers (explained below); and devices for actuating one or more geophysical energy sources. In the present example, such geophysical energy sources may include a seismic energy source 24 and an electromagnetic transmitter 26. The recording system 12 may also include computational equipment, including both hardware and software, for determining distances and geodetic positions based upon user input, information from sensor signals, acoustic range detection transceiver signals, heading sensors, and/or other navigational information.

The illustrated marine geophysical survey system includes one or more geophysical energy sources. For example, the illustrated seismic energy source 24 may be any type of marine seismic energy source known in the art, including, without limitation, air guns or arrays thereof, marine vibrators or arrays thereof, and water guns or arrays thereof. The illustrated electromagnetic transmitter 26 may be any device known in the art for inducing a time varying electromagnetic field in a body of water, including without limitation, spaced apart electrodes and wire coils or loops. The seismic energy source 24 and/or the electromagnetic transmitter 26 may each be towed at a selected depth in the water appropriate for the type of signals to be emitted and detected therefrom. In some embodiments, one or more of the geophysical sources may be towed by another vessel (not shown).

The survey vessel 10 may tow a first geophysical sensor streamer 14. In the present example embodiment such first geophysical sensor streamer 14 may be a seismic sensor streamer towed at a first selected depth in the body of water 11. For example, the first selected depth may be between about 5 m and about 25_m. The first geophysical sensor streamer 14 may include a plurality of longitudinally spaced apart seismic sensors 15, which may include particle motion responsive sensors, pressure or pressure time gradient responsive sensors, and/or any other type of sensor known in the art for detecting seismic energy propagating through the body of water 11. The first geophysical sensor streamer 14 may include one or more depth sensors 19, which may be pressure sensors or any other device known in the art for determining depth of the first geophysical sensor streamer 14 in the body of water 11 at the respective positions thereof. During surveying, the seismic energy source 24 may be actuated at selected times, and seismic energy may be detected by the seismic sensors 15. The recording system 12 may make a recording of the signals detected by each of the seismic sensors 15, typically indexed with respect to the actuation time of the seismic energy source 24. It will be appreciated by those skilled in the art that the foregoing example embodiment of first geophysical sensor streamer 14 represents only one type of geophysical sensor streamer, and other types may be used in other embodiments. In such other embodiments, the seismic sensors 15 may be substituted and/or accompanied by any other type of geophysical sensor, including as non-limiting examples electromagnetic sensors, temperature sensors, magnetometers, capacitance sensors, and resistivity sensors. In some embodiments, the first geophysical sensor streamer 14 may neither include seismic energy sensors nor electromagnetic sensors.

The first geophysical sensor streamer 14 may also include a plurality of acoustic range detection transceivers ("ARD transceivers") 20 at spaced apart locations along the first geophysical sensor streamer 14. In some embodiments, one or more ARD transceivers 20 may also be located proximate the survey vessel 10. The first geophysical sensor streamer 14 may be operated at such first depth in the water that it may be terminated at its aft end by a tail buoy 16. (As used herein, "aft" refers to the trailing direction while the first geophysical sensor streamer 14 is being towed.) Such tail buoy 16 may include a geodetic position signal receiver 18, such as a global navigation satellite system ("GNSS") receiver. Another geodetic position signal receiver 18A may be disposed proximate a forward end (with respect to towing direction) of the first geophysical sensor streamer 14, for example, on a float or similar device used to keep the geodetic position signal receiver 18A above the surface 11A of the body of water 11, for example, as shown at 16A in FIG. 1. The first geophysical sensor streamer 14 may also include a plurality of heading sensors 25 disposed along the first geophysical sensor streamer 14 at longitudinally spaced apart locations. A non-limiting example of a heading sensor is a geomagnetic heading sensor described in U.S. Pat. No. 4,481,611 issued to Burrage. Other examples of heading sensors, may include without limitation mechanical or fiber-optic gyrocompasses. The combination of measurements from the geodetic position signal receivers 18 on the tail buoy 16 and 18A on the head buoy 16A, the ARD transceivers 20 proximate the survey vessel 10 and at spaced apart locations along the first geophysical sensor streamer 14, and the heading measured by the heading sensors 25 may be used to infer the geodetic position of each seismic sensor 15 on first geophysical sensor streamer 14. For example, a geodetic position at the forward end and the aft end of the first geophysical sensor streamer 14 may be determined, and an approximate shape thereof may be inferred from the heading determined by each heading sensor 25.

In the present embodiment, the survey vessel 10 may tow a second geophysical sensor streamer 22 at a second depth in the body of water 11. In the present example embodiment, the second geophysical sensor streamer 22 may be an electromagnetic sensor streamer, having a plurality of longitudinally spaced apart electromagnetic sensors 17 thereon. In other embodiments, the second geophysical sensor streamer may have any type of geophysical sensor, including seismic sensors, as explained above with reference to the first geophysical sensor streamer 14. The electromagnetic sensors 17 may be any device known in the art for detecting one or more components of an electromagnetic field in the body of water 11. Such electromagnetic sensors 17 may include, without limitation, spaced apart electrodes, wire loops or coils, and magnetometers. During survey operations, the electromagnetic transmitter 26 may be actuated by passing electric current through the electromagnetic transmitter 26 at selected times. The electric current may include one or more transient events (e.g., switching current on, switching current off, reversing current polarity, or combinations thereof, either individual or in a predetermined sequence such as a pseudo random binary sequence). The electric current may also include one or more individual frequencies of alternating current, and may be switched on for a selected time duration. The recording system 12 may record signals detected by each of the electromagnetic sensors 17. The second geophysical sensor streamer 22 may also include a plurality of heading sensors 27 (which may be similar to those shown at 25 on the first geophysical sensor streamer 14, and which may be geomagnetic heading sensors as explained above or other type of heading sensor such as gyrocompasses) disposed thereon at longitudinally spaced apart locations. One of ordinary skill in the art with the benefit of this disclosure would be able to determine appropriate heading sensors for each geophysical sensor streamer.

The second geophysical sensor streamer 22 may also include a plurality of ARD transceivers 20 thereon at spaced apart locations. Such ARD transceivers 20 and techniques for determining distances therebetween are more fully described in U.S. Pat. No. 7,376,045 issued to Falkenberg et al. and incorporated herein by reference. A plurality of depth sensors 19 may also be disposed along the second geophysical sensor streamer 22 at spaced apart locations.

As will be appreciated by those skilled in the art having the benefit of this disclosure, the second geophysical sensor streamer 22 may be towed at a second selected depth which may be substantially greater depth in the body of water 11 than the first selected depth. In some embodiments, for example, if the second geophysical sensor streamer 22 is an electromagnetic sensor streamer, it may be towed at depths of between about 20 meters and about 50 m meters. In other embodiments, an electromagnetic sensor streamer may be towed at depths of between about 50 meters and about 100 meters or more. Thus, it may be impracticable to use geodetic position sensor signals or tail buoys to determine the geodetic position of any one or more of the electromagnetic sensors 17 along an electromagnetic sensor streamer if such is used as the second geophysical sensor streamer 22.

In the present example embodiment, the deflector (40 in FIG. 2) may be provided in order to ensure that there is almost always a substantial lateral offset between the first 14 and second 22 geophysical sensor streamers. Such lateral offset is important in order obtain results using a method according to the invention. The purpose for the lateral offset will be further explained with reference to FIGS. 2 through 4.

One example embodiment of a system to help determine the lateral offset may be a USBL system in which the second geophysical sensor 22 streamer may include a USBL transponder 23A for an ultra-short baseline (USBL) position detection system. One non-limiting example of such a system is sold by Sonardyne International Ltd., Blackbushe Business Park, Yateley, Hampshire, GU46 6GD United Kingdom under the trademark RANGER.

Figure 2:
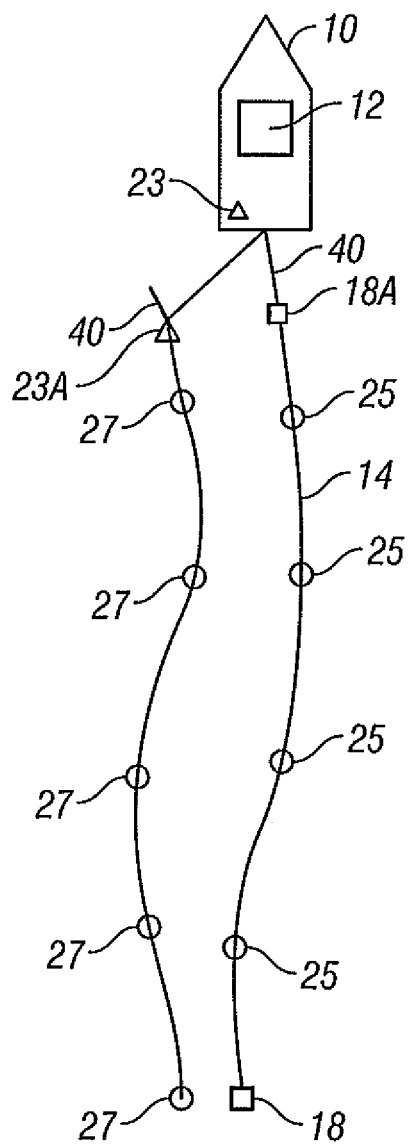
FIG. 2 is a plan view of the marine geophysical survey system shown in FIG. 1.

The survey vessel 10 may include a corresponding USBL transceiver 23 to enable determining both the range and direction of the on-streamer USBL transponder 23A with reference to the on-vessel USBL transceiver 23. An example embodiment of a procedure to make determinations of geodetic positions along the second geophysical sensor streamer 22 is as follows. FIG. 2 shows a plan view of the survey vessel 10, the heading sensors 25, 27 on the respective geophysical sensor streamers 14, 22, the geodetic position signal receivers 18, 18A, the USBL transceiver 23, and the USBL transponder 23A. From among the devices as explained above, the geodetic position signal receiver(s) 18, 18A and heading sensors 25 may be used to determine the geodetic position at each point along the first geophysical sensor streamer 14. The second geophysical sensor streamer 22 may not include geodetic position signal receivers, however its spatial distribution may be inferred from certain measurements used in conjunction with measurements made by components on the first geophysical sensor streamer 14 and with the lateral offset provided by the deflector 40. A deflector 40 is shown on both the first 14 and second 22 geophysical sensor streamers. For practical reasons, a deflector 40 may be more easily used on the first geophysical sensor streamer 14 because it is generally towed at shallower depth such that deflectors of types well known in the art may be used. However, the deflector 40 may be used on either or both of the first 14 and second 22 geophysical sensor streamers.

Methods according to embodiments of the invention may be used to infer the spatial distribution of second geophysical sensor streamer 22. As a principle of geometry, three lines of position are generally required to determine a position in space in three dimensions, wherein the three lines of position are not in the same plane. Because the first 14 and second 22 geophysical sensor streamers operate in substantially the same plane, notwithstanding the lateral offset provided by the deflector(s) 40, trilateration of distance measurements between ARD transceivers 20 may be insufficient to determine the position at every point along the second geophysical sensor streamer 22.

Figure 3B:
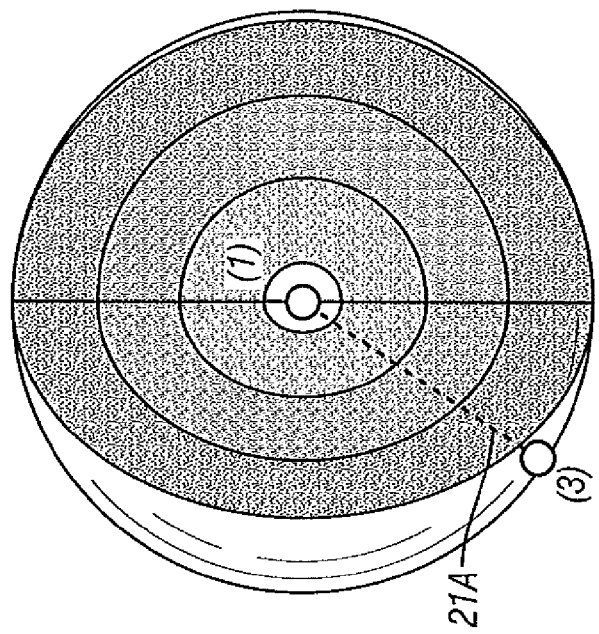
FIG. 3B shows a sphere of possible positions of a first point on the first streamer with reference to a second position on the second streamer.
Figure 3A:
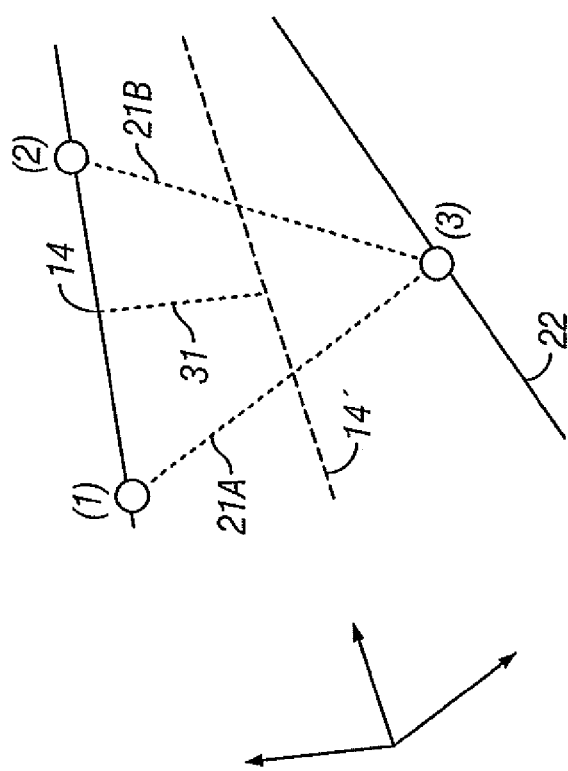
FIG. 3A is a view in the vertical plane of two streamers separated in depth and laterally offset from each other to illustrate the principle of an example embodiment.
Figure 3C:
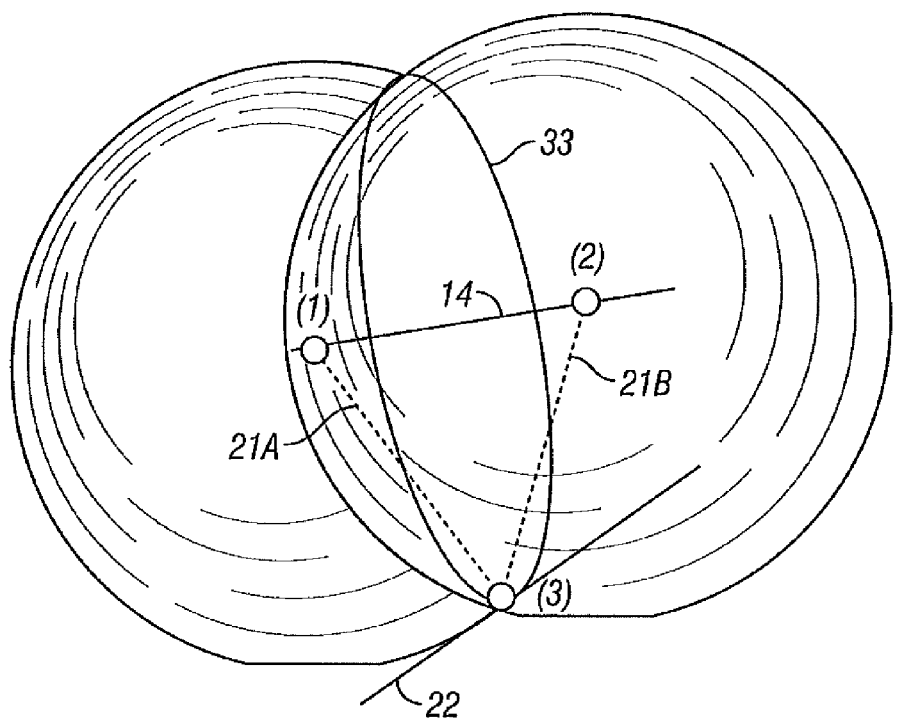
FIG. 3C shows intersection of the sphere of possible positions of FIG. 3B with a sphere of possible second positions on the second streamer forming a circle of possible positions.

With reference to FIG. 3A, a first distance 21A may be determined between a selected one of the ARD transceivers 20 shown at position 1 on the first geophysical sensor streamer 14 and a selected one of the ARD transceivers 20 shown at position 3 on the second geophysical sensor streamer 22. As illustrated, the first geophysical sensor streamer 14 is both above and laterally offset from the second geophysical sensor streamer 22. An imaginary line 14' illustrates the position of the first geophysical sensor streamer 14 displaced to be at the same depth as second geophysical sensor streamer 22. The difference in depth between the first 14 and second 22 geophysical sensor streamers is indicated at 31. As illustrated in FIG. 3B, the first distance 21A will define a first sphere centered at position 1 and having a radius equal to the first distance 21A. Likewise, a second distance 21B may be determined between a second one of the ARD transceivers 20 shown at position 2 on the first geophysical sensor streamer 14 and a the selected ARD transceiver 20 shown at position 3 on the second geophysical sensor streamer 22; and the second distance 21B will define a second sphere centered at position 2 and having a radius equal to the second distance 21B. As in FIG. 3C, the intersection of the first sphere with the second sphere will be a circle 33 centered on the first geophysical sensor streamer 14 and disposed in the plane perpendicular its longitudinal axis. The ARD transceiver 20 shown at position 3 on the second geophysical streamer 22 will be located on the foregoing circle.

Figure 4:
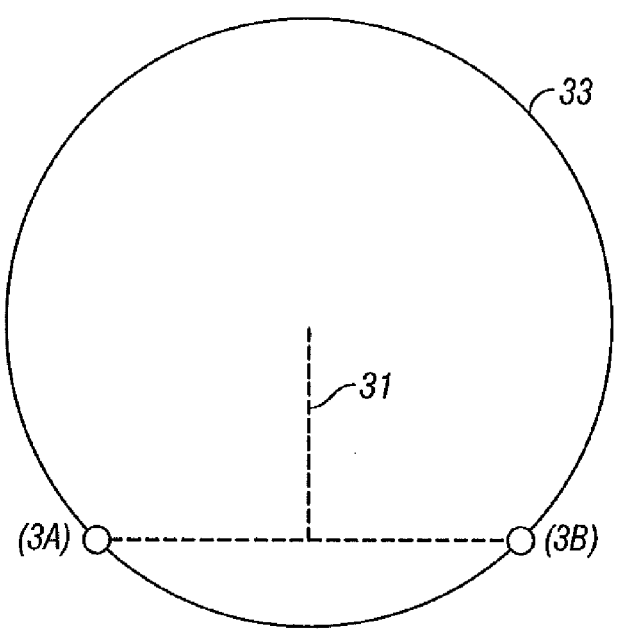
FIG. 4 shows a cross-sectional view of the streamers in FIG. 3B to illustrate resolving an initial position ambiguity with reference to the deeper of the two depth-separated streamers.

In order to find where on the circle 33 the ARD transceiver 20 at position 3 is located, and with reference to FIG. 4, the depth difference 31 between the first 14 and second geophysical sensor streamer 22 may be used. Such depth difference may be determined using measurements from depth sensors, for example, as shown at 19 in FIG. 1. Thus limited by the depth measurement, the position of the ARD transceiver 20 shown at 3 in FIG. 3 has two possible positions where the circle 33 intersects the measured depth of the second geophysical sensor streamer 22: (3A) and (3B).

In the present example embodiment, a known, substantial lateral offset may be provided as explained above between the first geophysical sensor streamer 14 and the second geophysical sensor streamer 22, e.g., by using one or more deflectors (see 40 in FIG. 2). The direction of the offset will uniquely identify the position of the ARD transceiver 20 as to either position 3A or position 3B. For example, if the second geophysical sensor streamer 22 has a starboard offset relative to the first geophysical streamer 14, the ARD transceiver 20 at position 3 will be located at a starboard initial position. A port offset will lead to a port initial position. Each of the port and starboard positions thus, represents a possible geodetic position of a selected point along the second geophysical sensor streamer 22. By using distances (e.g., 21 in FIG. 1) determined between pairs of ARD transceiver 20 on the first 14 and second 22 geophysical sensor streamers, and optionally using measurements of heading from the heading sensors 27, a geodetic position at every point along the second geophysical sensor streamer may be determined. The USBL transceiver 23, and the USBL transponder 23A may be used to confirm the direction and amount of the lateral offset in some example embodiments. It should be noted that the USBL system may assist in determining the lateral offset, but use thereof is not essential as long as the direction of the lateral offset is determinable. It may be sufficient in some embodiments, for example, to use the deflector (40 in FIG. 2) alone as long as such use results in a determinable direction of the lateral offset between the first geophysical sensor streamer 22 and the first geophysical sensor streamer 14.

It will be readily appreciated by those skilled in the art having the benefit of this disclosure that the scope of the present invention is not limited to towing and locating seismic sensor streamers and one or more electromagnetic sensor streamers as shown in and explained with reference to FIGS. 1 and 2. As may be inferred from the descriptions of the various streamers, the scope of the invention may extend to any first streamer operated at a first depth and having a tail buoy with geodetic position signal receiver thereon. A second streamer may operate at a second depth in the water. Using the technique explained above with reference to seismic sensor streamers and electromagnetic sensor streamers, it may be possible to locate a geodetic position of at least one point on such second geophysical sensor streamer.

A method according to the various aspects of the invention may enable determination of geodetic positions of a plurality of geophysical sensors along a geophysical sensor streamer without the need to measure geodetic position directly at any point along the submerged geophysical sensor streamers, e.g., an electromagnetic sensor streamer operated in conjunction with a seismic sensor streamer towed proximate the water surface Likewise, methods of conducting a geophysical survey may benefit from the determination of geodetic positions of a plurality of geophysical sensors along a submerged geophysical sensor streamers without the need to measure geodetic position directly at any point along the submerged geophysical sensor streamers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining geodetic position of a point on a second geophysical sensor streamer towed in a body of water, comprising:
   determining geodetic positions of a plurality of locations along a first geophysical sensor streamer which is towed at a first depth in the body of water;
   causing a lateral relative offset between the first geophysical sensor streamer and the second geophysical sensor streamer;
   measuring a distance between the point on the second geophysical sensor streamer and each of a first and a second selected points along the first geophysical sensor streamer;
   measuring a second depth at the point on the second geophysical sensor streamer, wherein the second depth is greater than the first depth;
   calculating a depth difference from the first depth and the second depth; and
   determining a geodetic position at the point on the second geophysical sensor streamer using the depth difference, a direction of the lateral relative offset from the first geophysical sensor streamer to the second geophysical sensor streamer and the measured distances.

2. The method of claim 1 wherein the measuring the distances comprises measuring acoustic travel time between spaced apart acoustic range detection transceivers.

3. The method of claim 1 wherein the determining geodetic positions comprises:
   determining a geodetic position of at least two selected locations along the first geophysical sensor streamer; and
   determining a heading at the plurality of locations along the first geophysical sensor streamer.

4. The method of claim 3 wherein the heading comprises geomagnetic heading.

5. The method of claim 1 wherein the second geophysical sensor streamer comprises a plurality of electromagnetic sensors.

6. The method of claim 5 further comprising:
   determining a heading at selected positions along the second geophysical sensor streamer; and
   determining a geodetic position of at least some of the plurality of electromagnetic sensors using the determined geodetic position of the point on the second geophysical sensor streamer and the determined heading at selected positions along the second geophysical sensor streamer.

7. The method of claim 5 further comprising:
   measuring distances between selected pairs of positions along the first and second geophysical sensor streamers; and
   determining a geodetic position of at least some of the plurality of electromagnetic sensors using the determined geodetic position of the point on the second geophysical sensor streamer and the measured distances between the selected pairs of positions along the first and second geophysical sensor streamers.

8. The method of claim 1 wherein the first geophysical sensor streamer comprises a plurality of seismic sensors.

9. The method of claim 1 wherein the determining geodetic positions of a plurality of locations along the first geophysical sensor streamer further comprises detecting a geodetic position signal at an aft end of the first geophysical sensor streamer.

10. The method of claim 1 wherein the second geophysical sensor streamer and the first geophysical sensor streamer comprise seismic sensors.

11. The method of claim 1 wherein causing lateral relative offset between the first geophysical sensor streamer and the second geophysical sensor streamer is performed using a deflector.

12. A method for geophysical surveying comprising:
   determining geodetic positions of a plurality of locations along a first geophysical sensor streamer which is towed at a first depth in the body of water;
   causing a lateral relative offset between the first geophysical sensor streamer and a second geophysical sensor streamer which is towed in the body of water;
   measuring a distance between a point on the second geophysical sensor streamer and each of a first and a second selected points along the first geophysical sensor streamer;
   measuring a second depth at the point on the second geophysical sensor streamer wherein the second depth is greater than the first depth;
   calculating a depth difference from the first depth and the second depth; and
   determining a geodetic position at the point on the second geophysical sensor using the depth difference, a direction of the lateral relative offset from the first geophysical sensor streamer to the second geophysical sensor streamer and the measured distances;
   actuating at least one geophysical energy source disposed in the body of water; and
   detecting geophysical signals with one or more geophysical sensors disposed on at least one of the first and second geophysical sensor streamers.

13. The method of claim 12 wherein the measuring the distances comprises measuring acoustic travel time between spaced apart acoustic range detection transceivers.

14. The method of claim 12 wherein the determining geodetic positions comprises:
   determining a geodetic position of at least two selected locations along the first geophysical sensor streamer; and
   determining a heading at the plurality of locations along the first geophysical sensor streamer.

15. The method of claim 14 wherein the heading comprises geomagnetic heading.

16. The method of claim 12 wherein the second geophysical sensor streamer comprises a plurality of electromagnetic sensors.

17. The method of claim 16 wherein:
   the actuating at least one geophysical energy source comprises actuating an electromagnetic transmitter; and
   the detecting geophysical signals comprises detecting electromagnetic signals with the plurality of electromagnetic sensors.

18. The method of claim 16 further comprising:
   determining a heading at selected positions along the second geophysical sensor streamer; and
   determining a geodetic position of at least some of the plurality of electromagnetic sensors using the determined geodetic position of the point on the second geophysical sensor streamer and of the determined heading at selected positions along the second geophysical sensor streamer.

19. The method of claim 16 further comprising:

Measuring distances between selected pairs of positions along the first and second geophysical sensor streamers; and determining a geodetic position of at least some of the plurality of electromagnetic sensors using the determined geodetic position of the point on the second geophysical sensor streamer and the measured distances between the selected pairs of positions along the first and second geophysical sensor streamers.

20. The method of claim 12 wherein the first geophysical sensor streamer comprises a plurality of seismic sensors.

21. The method of claim 20 wherein:

the actuating at least one geophysical energy source comprises actuating a seismic energy source; and the detecting geophysical signals comprises detecting seismic signals with the plurality of seismic sensors.

22. The method of claim 12 wherein the determining geodetic positions of a plurality of locations along the first geophysical sensor streamer further comprises detecting a geodetic position signal at an aft end of the first geophysical sensor streamer.

23. The method of claim 12 wherein the second geophysical sensor streamer and the first geophysical sensor streamer comprise seismic sensors.

24. The method of claim 12 wherein causing lateral relative offset between the first geophysical sensor streamer and the second geophysical sensor streamer is performed using a deflector.

\* \* \* \* \*